United States Patent [19]

Sanson

[11] 4,046,611
[45] Sept. 6, 1977

[54] MANUFACTURE OF CUSHIONS

[76] Inventor: Joseph F. Sanson, 66, Avenue du Colonel Morlaix-Demozay, 45190 Beaugency, France

[21] Appl. No.: 540,555

[22] Filed: Jan. 13, 1975

[30] Foreign Application Priority Data

Jan. 15, 1974 France .............................. 74.01274
Apr. 10, 1974 France .............................. 74.12661

[51] Int. Cl.² ..................... B29D 27/04; B29C 17/02; B32B 5/20
[52] U.S. Cl. ........................................ 156/79; 156/272; 264/46.6; 264/46.4; 264/46.8; 264/257; 264/267; 297/452; 297/DIG. 1; 425/169
[58] Field of Search ..................... 264/46.6, 46.8, 54, 264/46.4, 335; 297/452, DIG. 1; 156/79, 272; 425/169

[56] References Cited

U.S. PATENT DOCUMENTS

| 2,955,972 | 10/1960 | Wintermute et al. | 264/46.8 X |
| 3,187,069 | 6/1965 | Pincus et al. | 264/46.8 |
| 3,258,511 | 6/1966 | McGregor | 264/46.8 X |
| 3,349,153 | 10/1967 | Beck | 264/335 X |
| 3,943,215 | 3/1976 | Grüne et al. | 264/46.8 X |

FOREIGN PATENT DOCUMENTS

| 770,001 | 10/1967 | Canada | 264/46.6 |
| 43-22677 | 9/1968 | Japan | 264/46.4 |
| 47-47090 | 11/1972 | Japan | 264/46.4 |
| 873,518 | 7/1961 | United Kingdom | 264/46.8 |
| 1,325,622 | 8/1973 | United Kingdom | 264/46.6 |

*Primary Examiner*—Philip Anderson
*Attorney, Agent, or Firm*—St.Onge, Mayers, Steward & Reens

[57] ABSTRACT

A method of manufacturing a flexible cushion of foamed plastics material with an integrated cloth cover, comprising forming under vacuum to apply the cloth cover to the inner wall of a mold, and casting a plastics material capable of forming flexible foam, wherein before vacuum forming the cover in the mold the cloth is preformed, and wherein the cloth is maintained adjacent its periphery in a frame which allows the cloth to slide inwards without substantially elongating and undergoes at the level of the frame a peripheral shrinkage while avoiding plait formation, the cloth thus shaped being then fixed at the level of the frame.

13 Claims, 12 Drawing Figures

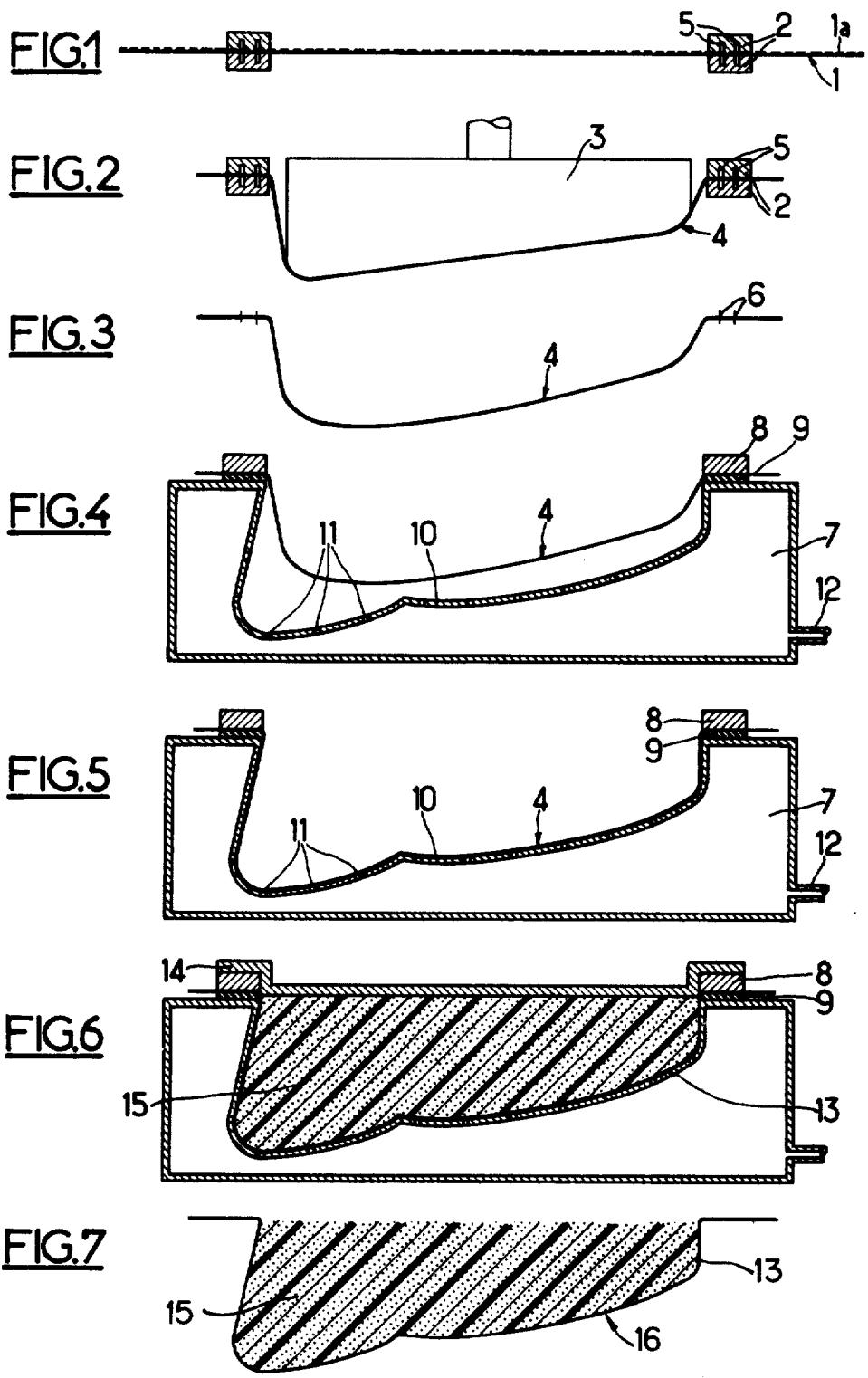

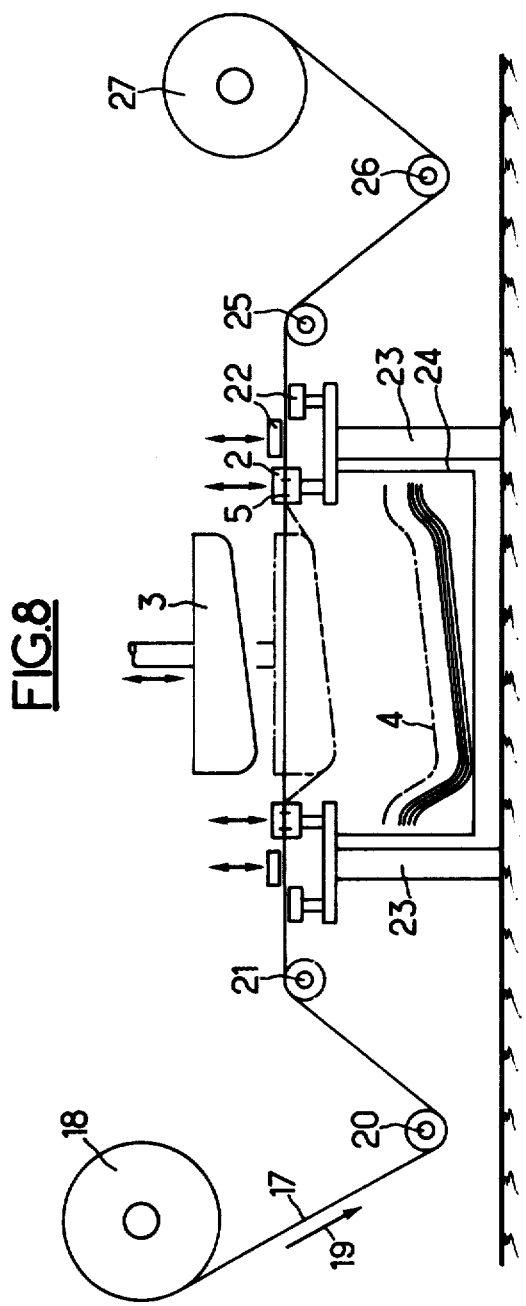

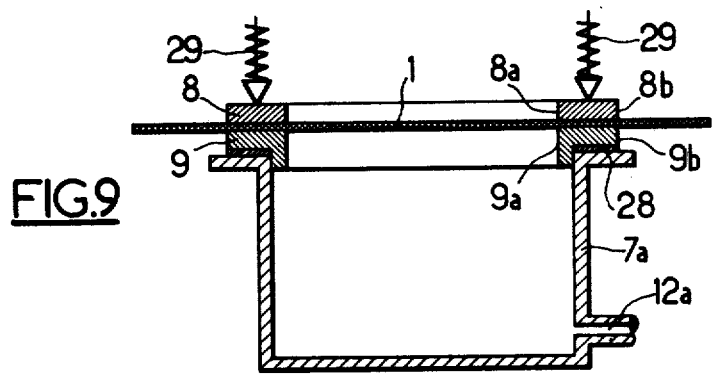
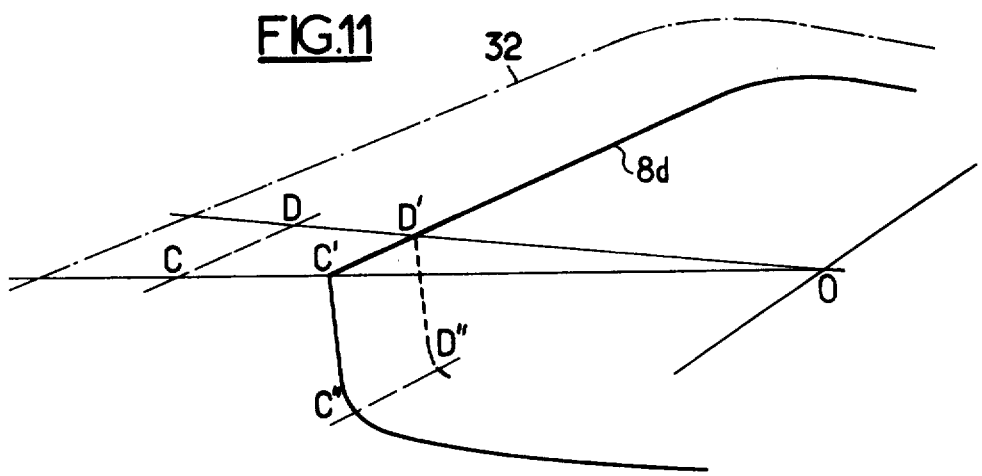
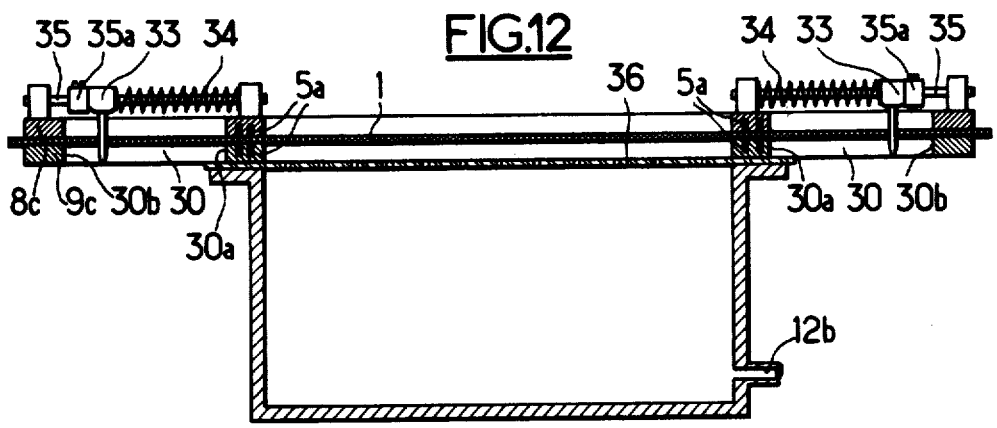

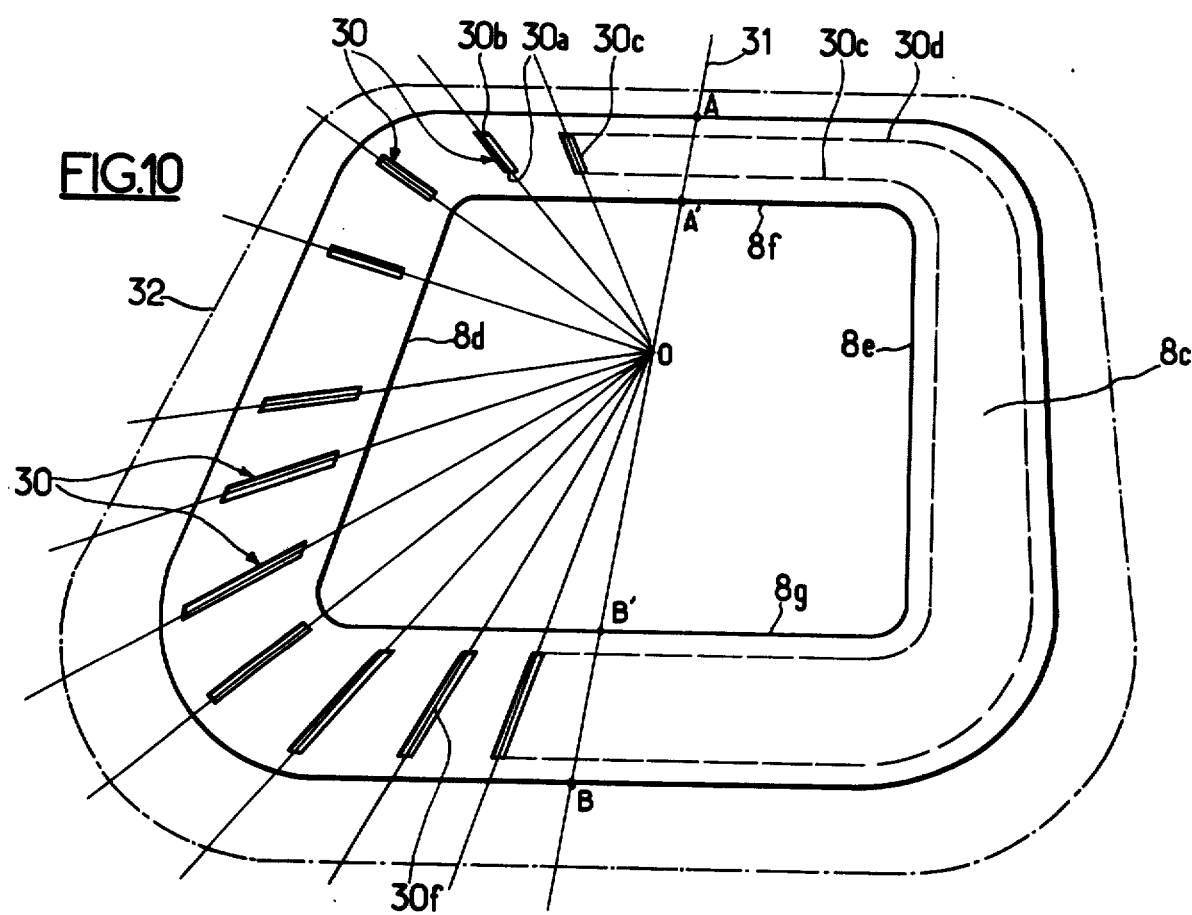

MANUFACTURE OF CUSHIONS

This invention relates to the manufacture of cushions and in particular to a method of manufacturing cushions of flexible foamed plastics material with an integrated cloth cover.

There is known a method of manufacturing such cushions which comprises forming undervacuum to apply a cloth cover to the inner wall of a mould, and casting a synthetic plastics material capable of forming flexible foam, for example by chemical reaction.

It is also known that to permit this forming under vacuum it is necessary to render the cloth air tight, for example by lining its inner face with a coating of elastic plastics material. Moreover, the cloth to be shaped under vacuum is generally held at its periphery by a tightened frame on the upper part of the mould.

If the cushion is of foamed polyurethane, the reaction mentioned above causes expansion of the mass inside the mould, and its adherance to the integrated cover is obtained, in general, upon polymerization of this foam. It is possible to then use the marginal part of cloth located between the frame and the mould for securing the cushion thus obtained to its support.

In order to avoid excessive deformation owing to lengthening of the cloth designed to form the covers, when the manufactured cushions require a great depth for the mould and an elastic return of this cloth after the plastics material has been cast and stripped, which tends to compress this material thereby reducing the dimensions of the cushions, it has already been suggested to provide play between these cloths and the respective peripheral frames so that the cloths are allowed to slide towards the inside of the moulds, at the level of the frames, upon being formed under vacuum, and the lengthening or stretching of these cloths is considerably reduced and thus the latter can be applied against the inner wall of the moulds.

However, the play thus provided at the level of the frames does not allow sufficient tightness to be obtained between these frames and the moulds, which requires that these moulds are constantly maintained under vacuum throughout the reaction and the consecutive polymerization of the foams, and also has the disadvantage of reducing the vacuum, which prevents perfect application of the cloths to the inner wall of the moulds.

Furthermore, a cloth acted upon only by the vacuum applied to its lower face does not in general undergo a suitable sliding throughout the periphery of the respective frames, and frequently plaits are formed, particularly at the corners of the moulds, which makes this method difficult to exploit on industrial scale.

The necessity of maintaining the vacuum until the polymerization of the foam is terminated, i.e. for a time varying between 5 to 10 minutes, for each cushion manufactured, prevents the attainment of high production rates, which are normally needed in the manufacture of articles of foamed polyurethane for example.

The present invention in one aspect provides a method of manufacturing a flexible cushion of foamed plastics material with an integrated cloth cover, comprising forming under vacuum to apply the cloth cover to the inner wall of a mould, and casting a foamable reactive resin mixture capable of forming a resilient cellular thermoset resin wherein, before vacuum forming, the cover in the mould the cloth is preformed into a pocket having a peripheral flange, and wherein the periphery or flange of the pocket is gripped in a frame which allows the cloth to slide inwards without substantially stretching and undergoes at the level of the frame a peripheral shrinkage while avoiding plait formation, the cloth thus shaped being then fixed at the level of the frame. By the term "fixed", what is meant is that adjacent yarns or strands in the flange of the cloth are welded, as by thermal fusion of the strands if they are thermal plastic, or alternatively by application of cement or glue, peripherally about the pocket after this is preformed in the cloth. The purpose of this fixing of the flange is to restrain a tendency of the cloth to return to its original, flat, condition upon release of the mold clamp.

Thus before the conventional forming operation under vacuum of a cover inside a mould which also serves for casting and for the polymerization of a foam designed to form the cushions, the cloth for forming this cover undergoes a preliminary shaping through suitable means capable of causing peripheral sliding of the cloth inside a frame which provides the required play and its partial stamping in the form of a pocket, without appreciable lengthening or stretching of the yarns forming the cloths, as for example knitted fabric. This is accomplished within limits compatible with the possibilities of peripheral shrinkage of these cloths (i.e., through compaction or reduction of the normal spacing between adjacent strands in a woven fabric), thereby avoiding the formation of plaits and any further contraction phenomena after the periphery of these cloths has been secured against expansion or contraction in the plane of the frame by the aforesaid welding or gluing for example.

As a result of this pre-moulding, it is possible to obtain a pocket of limited depth lower than that of the mould but with no plaits on its peripheral part.

When this pocket is then subjected to forming under vacuum by making use of a tightened frame clamped to the peripheral part, the lengthening undergone by the yarns forming the cloths becomes sufficiently reduced to allow perfect application of the foam to the inner wall of the mould, and to limit to a negligable value the effects of the elastic return mentioned above which could affect the foam forming the cushions.

It should be noted that after the pre-moulding operation of the pocket with peripheral shrinkage, the cloth forming this pocket could have an average fibre density higher than that of the starting cloth.

In general, the yarns forming the periphery of the pocket are fixed to each other by welding or fusing carried out by means of welding electrodes incorporated in the frame.

The same frames may be used for the pre-moulding and the forming under vacuum, the frames being provided with a sliding play or being tight, but in general it is more advantageous to provide, for the forming under vacuum, spacial tight frames and moulds having tight cases and quick-disconnect valve connections which allow these moulds to be disengaged from the vacuum system when the cloth is applied to the inner wall of the mould, which provides an arrangement for expediting production.

In a preferred embodiment of the invention designed to permit possible peripheral shrinkage of a foam integrated in a cushion of polyurethane foam upon shrinkage of this foam, the cloth stamping is terminated by peripheral contraction before attaining the limit at which plaits would form so that a residual margin of contraction is maintained which then allows the peripheral part of the cover to follow the possible shrinkage after casting of the polyurethane foam, with no plaits being produced, although this peripheral part has not undergone elastic stretching during the manufacture of the cushions.

By proceeding in this way, the elastic stretching of the yarns forming the cloth is increased but, on the other hand, there is provided a margin of peripheral contraction of the order of 5 to 10% with respect to the rate of maximum peripheral contraction of the cloth, thereby preventing all possible formation of plaits upon the shrinking of the polyurethane foam subsequent to its reaching an initial condition of structural integrity.

The means for carrying out this improved modification comprise, for each cloth used, the preliminary determination by means of a frame of circular shape of a coefficient of maximum peripheral contraction of the cloth, and the further determination of a slightly lower coefficient of optimum peripheral contraction, to be adopted in practice for limiting the pre-moulding of the rough-shaping, in such a way that in the sequence of the operations concerning the manufacture of the cushions, the possible shrinkage of polyurethane foam cannot lead to the formation of plaits.

To carry out this improved modification, there are provided in the pre-moulding frames, slots in which cloth guiding needles slide, the length and the orientation of which are determined as a function of the coefficient of optimum peripheral contraction so that when the needles abut against the ends of the slots close to the inner part of reduced dimensions of the frames, this optimum peripheral contraction coefficient is attained without being exceeded.

It should be noted that the provision of slots limiting the pre-moulding in the used frames and the use of two homothetic geometric locations for the ends of the slots allow pre-moulding of the rough shaping by forming under vacuum to be performed in spite of the sliding, to a greater or lesser extent, at various parts of the borders of the cushions depending upon the thickness of these cushions at the level of these different parts.

The mode of determination of the homothety centre to be adopted for defining the orientation and the length of the slots will be described in more detail below, this mode of determination meeting the following considerations.

In the transverse direction of a vehicle to be equipped with a cushion manufactured by the method of the invention, the homothety centre is located in a plane located at equal distances from the longitudinal borders of the cushion, the thickness of this cushion varying very little in the transverse direction.

In the longitudinal direction of the vehicle, where the cushion has in general an upwardly increasing thickness, the distance from the homothety centre to the part of cloth located in front of the cushion is greater than its distance to the part located at the rear of this cushion, the ratio between these two distances being equal to the ratio of the corresponding thicknesses provided at the front of and at the rear of the cushion, so that during pre-moulding of the rough-shaping the sliding is greater at the front than at the back with respect to the cushion, and equal for example to twice the sliding at the rear or back, and the respective lengths of the corresponding slots can be arranged one on the extension of the other and chosen in the same ratio. Moreover, all the slots are concurrent and pass through the homothety centre.

The invention in another aspect provides apparatus for carrying out the preferred embodiment of the method according to the first aspect of the invention comprising a measuring device having two superimposed circular frames for determining the said coefficient of maximum peripheral contraction; a device for pre-forming rough-shapings which comprises two superimposed frames of shape in accordance with that of the cushions to be manufactured; a guide device for radially displacing towards the homothety centre needles crossing the cloth of the rough-shapings, the said guide device having abutments limiting the said displacement corresponding to a constant homothety ratio between the respective distances of the said needles at the said homothety centre before and after the said displacement and the said coefficient of optimum peripheral contraction; and a device for holding the said needles in positions normal to the said superimposed frames.

The invention will be further described by way of example only with reference to the accompanying drawings, in which:

FIGS. 1 to 7 are diagrammatic side views, partly in section, illustrating the various steps of one embodiment for carrying out the method according to the invention;

FIG. 8 is a schematic side view of apparatus for carrying out a semicontinuous method according to the invention comprising a pre-moulding of pockets from a continuous tape of cloth;

FIG. 9 is a vertical diametric section of a pre-moulding device for obtaining rough-shapings of circular shape and employing forming under vacuum, this device serving to determine the maximum peripheral contraction index of various cloths for covers to be integrated into cushions of polyurethane foam;

FIG. 10 is a plan view from below of a pre-moulding mould for asymmetric rough-shapings and shows the orientation and the length of various limit slots limiting the sliding of the peripheral cloth of a initially plane piece, within the limits of the optimum peripheral contraction coefficient, and the frame in which the slots are formed;

FIG. 11 is a partially diagrammatic perspective view of a rough-shaping obtained through pre-moulding of a piece of initially plane cloth, and shows the orientation of a part of the piece of cloth after premoulding of this rough-shaping and FIG. 12 is a sectional view of a device for premoulding rough-shapings under vacuum of the same type as that shown in FIG. 9 but relating to a non-circular shape of rough-shaping as shown in FIG. 10, this device being equipped with driving needles for the cloth between the two superimposed parts of the frame, and with guide slots for the needles as shown in FIG. 10.

FIG. 1 shows a piece of cloth 1 coated on its upper face with an elastic plastics coating 1a, the cloth 1 being placed within a frame 2 having two superimposed parts. These two parts are assembled in such a manner that a slight sliding play is provided between them and the cloth, for example by providing an abutment on one of the parts of the frames. A sufficient amount of cloth is left extending from the frame to allow a further stamping and sliding of this cloth inward of its frame without the cloth detaching from the periphery of the frame.

The cloth is depressed centrally of the frame 2 by any suitable means, such as a die 3 as shown in FIG. 2, so as to cause it to slide marginally inwards to form a pocket 4 without causing any appreciable lengthening of the yarns of the cloth and without exceeding the limit at which plaits would necessarily result at the level of the frame 2, in spite of the possibilities of peripheral shrinkage of the cloth owing to relative movements of adjacent yarns or loops forming the same.

It will be understood that it is this peripheral shrinkage which allows a piece of cloth greatly exceeding the frame, possibly in a variable proportion depending upon the considered point, to form a pocket limited by the dimensions of the frame.

The cloth is then fixed at the periphery thereof through any suitable means for example by means of two welding electrodes 5 incorporated in the frame 2 as shown in FIGS. 1 and 2. The two parallel weld lines 6 obtained, which connects the adjacent yarns of the cloth to each other, are shown in FIG. 3.

The pocket 4 thus obtained is then removed from the frame 2 and is placed in a moulding frame 7 for forming under vacuum. The border of the cloth is tightly clamped between a frame 8 and a gasket 9 resting on the upper part of the mould 7. The mould includes a moulding surface 10 which has holes 11 through which the vacuum in the mould can be established, for example through a connection 12 in communication with a vacuum system, whereby a vacuum may be established in the space between the mould surface 10 and the pocket 4.

The pocket 4 to which the vacuum is applied then takes the form of the surface 10 as shown in FIG. 5, the yarns forming the cloth being stretched only sufficiently to avoid, after casting and polymerization of the foam, a considerable compression of this foam which would tend to modify the dimensions of the cushion obtained.

Because of the seal formed at of the border or periphery of the cloth of the mould, the vacuum may be disconnected without danger of air leaks during the casting and polymerization of the foam.

After this casting on the inner side of a cover 13 under vacuum within the mould, the mould is closed, for example by means of a lid 14 as shown in FIG. 6. After the foam 15 has polymerized it adheres to the cover 13 and the finished cushion 16 with an integrated cover can then be removed from the mould as shown in FIG. 7. The border or periphery of the cover 13 which was located outside the mould can serve to secure the cushion to its support, for example an automotive seat frame.

It is also possible to eliminate the welding electrodes incorporated in the frame and to fix the yarns of the peripheral cloth of the pocket 4 to each other through seams of glue for example on either part of the frame 2.

As mentioned above, it is also possible to use the same frame 2 for premoulding the pocket as well as for vacuum forming the cover, instead of carrying out the latter operation by means of a special frame 8 consisting of a single piece.

FIG. 8 diagrammatically illustrates apparatus for carrying out in a semicontinuous manner the pocket forming stage of the method described above. A continuous tape of cloth 17 supplied by a take-off bobbin 18 moves in the direction indicated by the arrow 19 to a tensioning roller 20 and an idling roller 21 on a working table having at least one frame 2 of the type described above. After closing this frame 2 and stopping the movement of the cloth tape, a die 3 of suitable shape descends into the frame 2 to form a cloth pocket 4 as described above. The cloth is fixed in this form by means of welding electrodes 5 incorporated in the frame 2. A cut-off knife 22, the fixed part of which is mounted on a support 23, is then actuated to cut off the cloth around the frame 2. The frame 2 as well as the knife 22 are then simultaneously opened and the pocket 4 falls into a container 24 arranged below the working table, while the die 3 ascends. The cloth tape 17 can then move forward again for the formation of a new pocket 4, while the part of the tape from which the preceding pocket has been cut away is wound on a bobbin 27 via an idling roller 25 and a tensioning roller 26. The pocket-forming cycle is then repeated with the same sequence of operations.

Such a pre-forming device can supply at the required speed an industrial plant for the manufacture of foam cushions with integrated covers by making use of quick-disconnect connections and tight unions, thereby allowing easy disengagement of the moulds for the formation under vacuum from the vacuum producing system after the casting of the foam has been effected.

It should be noted that the method described above allows the integrated covers to be protected in a very simple manner. In fact, it is sufficient to place a perforated plastics film on the frame 2 under the cloth 1, this film having a large elongation upon failure. This film follows the cloth to which it is seamed, glued or welded, during the formation of the pocket. During the formation under vacuum, this film rests against the mould surface and then reaches the cover which is thus protected until the finished cushion is used.

FIG. 9 shows a mould 7a for forming under vacuum, which mould is circular in shape and supports, through a connection 28, two separated frames 8 and 9 which are urged one towards the other by means of springs 29 which may be adjusted in such a manner as to allow deformation under vacuum of a length of cloth 1 through sliding of its peripheral part between the frames 8 and 9, and has a quick-disconnect valve connection 12a connected to a vacuum system.

As will be explained below, the cloth 1 is previously made air tight by means of a thin plastics film formed on its lower face and the formation under vacuum is terminated when plaits are formed between the two frames 8 and 9 and near these frames, after the periphery of the inner borders 8a, 9a and/or the outer borders 8b, 9b of these frames have been marked on the cloth.

The frames 8 and 9 do not have welding electrodes similar to the electrodes 5 shown in FIGS. 1 and 2, because the purpose in this case is not to preform a rough-shaping but simply to determine a maximum peripheral contraction index equal to the ratio of the diameters of the cloth length at the level of the internal and/or external borders, before and after the formation under vacuum.

Depending upon the shape of the cushions to be manufactured, as an optimum peripheral contraction coefficient for the preforming of rough-shaping, a value equal to that of the maximum peripheral contraction index decreased by 5 to 10% is used.

FIG. 10 shows an upper frame 8c of asymmetric shape and pertains to the manufacture of cushions for seats for drivers of motor vehicles and not for seats before being completed and symmetric in shape with respect to the longitudinal symmetry plane of such vehicles.

The frame 8c has a radial width considerably increased towards the lower part of FIG. 10 corresponding to the front of the driving seat. This width is approximately double that at the rear of the same cushion, as may be determined by comparing the segments BB' and AA'.

As shown in FIG. 12, slots 30 allow the sliding of the cloth between two superimposed frames 8c and 9c to be limited, and all converge to a point 0 which is the homothety centre of two geometric locations 30c and 30d indicated by broken lines of the inner and outer ends 30a and 30b of the slots 30.

The homothety centre 0 is spaced from the part of the corresponding frame at the front of the cushion which is substantially equal to twice its distance to the corresponding part of the frame corresponding to the rear of this cushion, i.e. OA' is substantially equal to half OB' while OA and AA' are substantially equal to half OB and BB'.

The axis 31 on which the point 0 lies represents the intersection of a vertical symmetry plane relative to the left hand and right hand side of the superimposed frames 8c and 9c. The series of slots 30 are then arranged in pairs on the left and right sides of the frame at locations, for each pair, determined by lines drawn across the frame parallel to the transverse ends (8f and 8g) of the frame.

By extending the axis 31, it may be seen that this axis leads to the intersection point between the lateral borders 8d and 8e.

The centre of homothety 0 is then defined in the transverse direction (i.e., left to right as seen in FIG. 10) by a vertical plane passing through the axis 31, and in the longitudinal direction (i.e., top to bottom as seen in FIG. 10) by a convenient ratio between the segments OA' and OB' which correspond for example to a double thickness of the front part of the cushions with respect to the thickness of their rear part. That is, if the forward edge of the cushion is to be twice as thick as the back of the cushion, the OB' is approximately twice OA'.

Similarly, in FIG. 10, AA' is substantially equal to half BB', the respective lengths of a slot such as 30e located near the right segment AA' and of a slot such as that indicated at 30f located at the opposite side are also in the same homothety ratio (30f = 2×30e).

In FIG. 11, the border 32 of the starting cloth piece is indicated by broken lines.

After sliding this cloth at the level of various slots 30 from the outer end 30b of these slots to their inner end 30a, the border 32 is retracted to lie between the frames 8c and 9c at a position which has not been shown in FIG. 10 but is preferably adjacent the ends 30b of the slots 30.

It will be apparent from the above that the constant ratio between the respective distances from the homothety centre 0 to the ends 30a and 30b of the various slots 30 is equal to the respective homothety ratio, i.e. the geometric location 30d is homothetic of the geometric location 30c and the ratio between the respective lengths of these two geometric locations is equal to the optimum peripheral contraction index.

Near the inner border such as the border 8d in FIG. 10, a part of the horizontal length of cloth 1 initially located between two adjacent slots 30 and as shown at CDC'D' in FIG. 11 is substantially oriented after performing in a vertical plane at C'DC'D'', as is also shown in FIG. 11, and forms a part of the rough-shaping.

The homothety ratio mentioned above, which is defined as being equal to CD/C'D' is also equal to the ratio OC/OC' corresponding to a determined slot 30, while the ratio OD/OD' corresponds to the adjacent slot 30.

It should be noted, however, that the peripheral contraction at the level of the segment CD has modified the shape of the piece of cloth.

The device shown in FIG. 12 allows the sliding of the cloth at the level of two slots of a length substantially equal to each other and arranged one on the extension of the other, to be limited on either side of the homothety centre 0.

In FIG. 12, needles 33 crossing the cloth length 1 can move along the inner borders 30a and the outer borders 30b of two slots 30, these needles being slidably maintained in the frames 8c and 9c until the needles 33 abut against the inner borders 30a of the slots 30.

The vacuum applied through the connection 12b has to overcome the action of two springs 34 which tend to maintain the cloth in a tensioned position throughout the surface within the outer border 30b of the slots. These springs 34 are mounted on guide axes 35 of the needles 33.

In order to hold the cloth length 1 substantially flat when the same is placed on the lower frame 9c, a rubber perforated membrane 36 is provided below this lower frame.

In view of the thinness of this elastic film and the perforations in it, the length of cloth 1, which has been previously tightened, may be stamped without difficulty upon preforming the rough-shaping, thereby compressing the springs 34.

When the needles 33 abut against the border 30a the maximum peripheral contraction is not yet attained. However, the peripheral part of the rough-shaping is fixed for example by welding by means of electrodes 5a similar to those shown in FIGS. 1 and 2. The further sequence of operations for manufacturing the cushion is then the same as described above.

The guide axes 35 have abutments 35a at their rear part which allow optimum adjustment of the sliding of the cloth and the stroke of the needles at the level of each single slot 30 and they may be blocked in position by any suitable means.

The invention will be further described with reference to the following illustrative Example.

EXAMPLE

It was desired to manufacture a cushion of flexible polyurethane foam having an integrated cover formed of a knitted fabric of "Nylon" which can be cold extended with dimensions of 40% and 30% respectively, i.e. its surface can be increased by a maximum of 82% by stretching it but has on average a possibility of linear return of the order of 30% in all directions.

For formation under vacuum, the cloth had been rendered air tight in a conventional manner by adhesion of a PVC film of 50 microns thickness.

Assuming that a circular mould of 50 cm diameter and 15 cm deep was to be used which had a total mould surface of 4319 cm$^2$ and a circular opening of area 1963 cm$^2$, it would have been necessary to increase the surface of the cloth during forming under vacuum by about 120%, which would be impossible since the cloth admits a surface increase only of the order of 82%.

By employing the method according to the invention, advantage was taken of the peripheral shrinkage of the cloth of the order of 30% during the formation of the pockets, in order to cause a cloth disc having a circumference of 204 cm to enter a frame of diameter 50 cm and thus having a circumference of 157 cm, i.e. a surface area of 3316 cm$^2$, without the yarns forming this cloth undergoing a considerable stretching.

These 3316 cm$^2$ of cloth could be extended by further stretching of about 82% so that they could possibly match with a surface of 6035 cm$^2$, much greater than that of the mould surface. It was thus possible to easily apply, under vacuum and throughout the mould surface, the previously stamped cloth in the form of a pocket without wasting the respective possibilities of stretching.

It should be noted that the method according to the invention can be easily applied to knitted fabrics which are cold extensible, and also to conventional chain and weft thermoplastic fabrics which require a given temperature increase for their formation under vacuum.

I claim:

1. A method of manufacturing a flexible cushion of foamed plastics material with an integrated cover of cloth that is resiliently stretchable, which comprises
    placing a flat piece of cloth between complementary members of a preforming frame to dispose the cloth in substantially smooth unstretched condition with its margins projecting between said frame members;
    exerting sufficient pressure on said frame members to restrain said cloth while permitting it to be slid between said members without causing stretching of the cloth to its elastic limit;
    depressing said cloth centrally of said frame to draw the cloth margins inwardly between the frame members to cause peripheral contraction of said piece of cloth and to preform a pocket therein wherein the cloth is still in substantially unstretched condition, this pocket forming operation providing the major conformation of the cloth shaping to the mold surface but being discontinued prior to development of plaits in the cloth;
    fixing the periphery of said piece of cloth in the plane of said preforming frame to retain said cloth as a preformed, essentially unstretched pocket having a peripheral flange and restrain said cloth against return to its original condition;
    placing said preformed peripherally flanged pocket on a recessed vacuum mold having an inner surface configured to the desired shape of the finished cushion, sealing said peripheral flange of said pocket about the recessed mold and applying a vacuum to the mold to resiliently stretch the preformed pocket to conform it to the inner surface of the mold; and
    placing a foamable reactive resin mixture capable of forming a resilient cellular thermoset resin in said stretched pocket and allowing it to expand in said mold and become bonded to the cloth therein so as to produce, when a condition of structural integrity of the foam has been reached, said flexible cushion with integrated cover.

2. A method according to claim 1, wherein said fixing of the peripheral portions of said preformed cloth is achieved by peripheral welding carried out by means of welding electrodes incorporated in the frame.

3. A method according to claim 1, wherein said fixing of the peripheral portions of said preformed cloth is achieved by means of gluing between contiguous yarns forming the cloth.

4. A method according to claim 1, wherein said forming under vacuum is carried out by using a peripheral connection tightly mounted on the mold.

5. A method according to claim 1, wherein, prior to carrying out the preforming, rendering the cloth airtight by applying to its face which will contact the foam a coating of an elastic plastics material.

6. A method according to claim 1, wherein prior to carrying out the preforming, arranging a perforated plastics film below the cloth in the frame, and fixing the said film to the cloth after preforming the cloth to protect the cover.

7. A method according to claim 1, wherein an optimum peripheral contraction coefficient is preliminarily determined for each cloth to be used, the said coefficient being lower than 5 to 10% depending upon the shape of the cushions to be manufactured, with respect to a maximum peripheral contraction coefficient obtained by measuring this contraction on circular planes of the cloth, and wherein a deformation is caused by sliding movement limited by their peripheral borders between two superimposed frames also of circular shape with no formation of plaits nor lengthening of the yarns forming this cloth; and wherein on a symmetry axis passing through the intersection of two longitudinal superimposed borders which can be used for preforming respective rough-shaping with peripheral shrinkage, a homothety centre is then determined which is arranged at respective distances from two transverse borders of these two superimposed frames, the said distances being proportional to the respective thicknesses of the cushions at the level of the corresponding transverse borders of these rough-shapings; and wherein on the said superimposed frames a guide device is provided for the radial displacement towards the said homothety centre of needles crossing the cloth of the rough-shapings, the said guide device having abutments for limiting the said displacement corresponding to a constant homothety ratio between the respective distances of the said needles from the homothety centre before and after this displacement and the said coefficient of optimum peripheral contraction; and wherein the said needles are maintained in positions normal to the said upper frames; and wherein the cloth is moved toward the homothety centre until the said needles contact the said limitations abutments.

8. Method according to claim 7 wherein the guide device which is utilized for radial displacement of needles crossing the cloth of the rough-shapings towards the said homothety centre, comprises straight slots substantially equidistant from each other and radially arranged about the said homothety centre.

9. Method according to claim 7, wherein the said superimposed circular frames which are utilized for measuring said maximum peripheral contraction coefficient are caused to rest on an air-tight seal.

10. Method according to claim 7, wherein a forming mold for shaping under vacuum is utilized, for preforming said rough-shapings, to which mold the lower of the assembly of said superimposed frames is fixed.

11. Method according to claim 10, wherein said lower frame is fixed to said forming mold for shaping under vacuum, through a perforated membrane of rubber having a slight thickness.

12. Method according to claim 8, wherein the device which is utilized for preforming rough-shapings comprises two guide axes of the said needles in the said slots and wherein said needles are moved away by springs from the said homothety centre.

13. Method according to claim 12, wherein each of the said guide axes is provided, towards the outside of the frame, with an abutment for adjusting the stroke, having means for locking it in position.

* * * * *